(12) United States Patent
Chang et al.

(10) Patent No.: US 12,372,701 B2
(45) Date of Patent: Jul. 29, 2025

(54) NARROW BANDPASS FILTERING ELEMENT

(71) Applicant: VACTRONICS TECHNOLOGIES INC., Miaoli County (TW)

(72) Inventors: Huang-Ming Chang, Miaoli County (TW); Yung-Sheng Cheng, Miaoli County (TW); Tsung-Yen Tsai, Miaoli County (TW); Sen-Tsung Hsiao, Miaoli County (TW)

(73) Assignee: Vactronics Technologies Inc., Miaoli (TW)

( * ) Notice: Subject to any disclaimer, the term of this patent is extended or adjusted under 35 U.S.C. 154(b) by 381 days.

(21) Appl. No.: 18/187,322

(22) Filed: Mar. 21, 2023

(65) Prior Publication Data

US 2024/0319423 A1    Sep. 26, 2024

(51) Int. Cl.
*G02B 5/28* (2006.01)

(52) U.S. Cl.
CPC .................... *G02B 5/288* (2013.01)

(58) Field of Classification Search
CPC ...................................... G02B 5/288
USPC ......................................... 359/580
See application file for complete search history.

(56) References Cited

U.S. PATENT DOCUMENTS

| | | | |
|---|---|---|---|
| 2003/0039847 A1* | 2/2003 | Dalakos ................. | C23C 16/24 428/448 |
| 2014/0210031 A1* | 7/2014 | Hendrix ................. | G02B 5/288 359/359 |
| 2016/0238759 A1* | 8/2016 | Sprague ................. | C23C 14/06 |
| 2018/0321428 A1* | 11/2018 | Jones ..................... | G01J 3/02 |
| 2019/0146131 A1 | 5/2019 | Ockenfuss | |
| 2020/0209448 A1* | 7/2020 | Rowlands ............. | C23C 28/345 |
| 2022/0120950 A1* | 4/2022 | Chen ..................... | G02B 5/281 |

FOREIGN PATENT DOCUMENTS

TW        M587754 U        12/2019

* cited by examiner

*Primary Examiner* — Sharrief I Broome
(74) *Attorney, Agent, or Firm* — Wang Law Firm, Inc.

(57) ABSTRACT

A narrow bandpass filtering element includes a substrate, a bandpass filtering structure and an anti-reflection structure, and the bandpass filtering structure and anti-reflection structure are formed on two opposite surfaces of the substrate respectively. The bandpass filtering structure includes NbTiOx layers, first material layers with a higher refractive index than the NbTiOx layer, and second material layers with a lower refractive index than the NbTiOx layer, and the NbTiOx layers, first material layers and second material layers are stacked along a normal line of the substrate. Therefore, light in a specific wave band fitting a narrow passband can pass through the narrow bandpass filtering element.

25 Claims, 4 Drawing Sheets

NARROW BANDPASS FILTERING ELEMENT

BACKGROUND

Field of the Invention

The present invention relates to an optical element, and more particularly to a narrow bandpass filtering element.

Description of Related Art

One of the common manufacturing processes of existing bandpass filtering elements is to use the traditional sputtering machine to form binary compound films. Therefore, the material's adjustability is lower, the system energy consumption is larger, the number of film layers of the element is larger, the total thickness is thicker, and when silicon and hydrogen interact, the refractive index of the product is unstable.

Relevant patent documents include US20190146131A1 and TWM587754U.

SUMMARY

One objective of the present invention is to provide a narrow bandpass filtering element and an electronic device, which can allow the light in a specific waveband that conforms to a narrow passband, to pass through the narrow bandpass filtering element.

A narrow bandpass filtering element in accordance with an embodiment of the invention includes: a substrate including a first surface and a second surface opposite to the first surface; a bandpass filtering structure formed on the first surface and including a plurality of NbTiOx layers, a plurality of first material layers with a refractive index higher than a refractive index of the NbTiOx layer, and a plurality of second material layers with a refractive index lower than the refractive index of the NbTiOx layer, wherein the plurality of NbTiOx layers, the plurality of first material layers and the plurality of second material layers are stacked along a normal line of the substrate; and an anti-reflection structure formed on the second surface.

Optionally, the anti-reflection structure includes a plurality of third material layers and a plurality of fourth material layers, which are alternatively stacked along the normal line, and a refractive index of the third material layer is greater than a refractive index of the fourth material layer.

Optionally, the refractive index of the NbTiOx layers in a wavelength range of 850 nm~940 nm is 2.5.

Optionally, an extinction coefficient of the NbTiOx layers is $0.1 \times 10^{-10}$ $cm^{-1}$~$1.0 \times 10^{-10}$ $cm^{-1}$.

Optionally, the refractive index of the first material layers in a wavelength range of 850 nm~940 nm is 3.3 or 3.6.

Optionally, an extinction coefficient of the first material layers is $3.85 \times 10^{-5}$ $cm^{-1}$~$3.56 \times 10^{-4}$ $cm^{-1}$ (n=3.3), or an extinction coefficient of the first material layers is $1.7 \times 10^{-4}$ $cm^{-1}$~$1.1 \times 10^{-3}$ $cm^{-1}$ (n=3.6).

Optionally, the refractive index of the third material layers in a wavelength range of 850 nm~940 nm is 3.3 or 3.6.

Optionally, an extinction coefficient of the third material layers is $3.85 \times 10^{-5}$ $cm^{-1}$~$3.56 \times 10^{-4}$ $cm^{-1}$ (n=3.3), or an extinction coefficient of the first material layers is $1.7 \times 10^{-4}$ $cm^{-1}$~$1.1 \times 10^{-3}$ $cm^{-1}$ (n=3.6).

Optionally, a bandwidth of the narrow bandpass filtering element is 60 nm.

The invention also provides an electronic device with the abovementioned bandpass filtering element.

In this invention, the narrow bandpass filtering element can be manufactured by an inductively coupled plasma (ICP) plasma sputtering method.

BRIEF DESCRIPTION OF THE DRAWINGS

After studying the detailed description in conjunction with the following drawings, other aspects and advantages of the present invention will be discovered.

DETAILED DESCRIPTION

Figure 1:
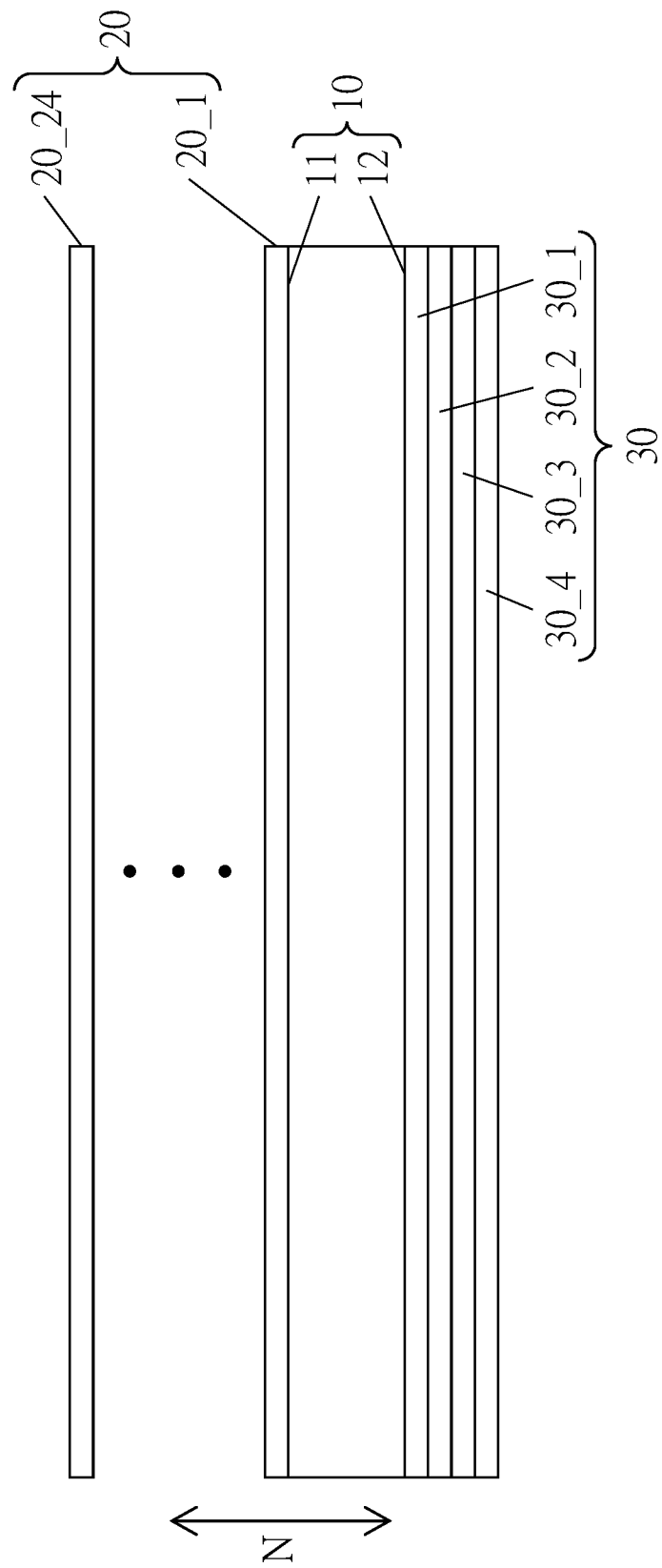
FIG. 1 is a schematic cross-section view of a narrow bandpass filtering element according to a first embodiment of the present invention.

The invention provides a narrow bandpass filtering element includes: a substrate, which has a first surface and a second surface opposite to the first surface; a bandpass filtering structure formed on the first surface and including a plurality of NbTiOx (Niobium titanium oxide) layers, a plurality of first material layers with a refractive index higher than a refractive index of the NbTiOx layer, and a plurality of second material layers with a refractive index lower than a refractive index of the NbTiOx layer; the NbTiOx layers, the first material layers and the second material layers are stacked along a normal line of the substrate; and an anti-reflection structure formed on the second surface.

The number of film layers of the bandpass filtering structure is greater than that of the anti-reflection structure. Optionally, the number of film layers of the bandpass filtering structure is 1.7~6 times that of the anti-reflection structure.

Optionally, the bandpass filtering structure includes a plurality of sets of film layers put into a stack, the plurality of sets of film layers includes a plurality of first sets of film layers and a plurality of second sets of film layers, each of the plurality of first sets of film layers includes one of the plurality of first material layers and one of the plurality of second material layers, and each of the plurality of second sets of film layers includes one of the plurality of first material layers and one of the plurality of NbTiOx layers.

Optionally, the plurality of sets of film layers further includes a third set of film layers, and the third set of film layers is composed of one of the plurality of NbTiOx layers and one of the plurality of second material layers, and is located between adjacent two of the plurality of first sets of film layers.

Optionally, at least two of the plurality of first sets of film layers are stacked together. Or, at least two of the plurality of second sets of film layers are stacked together. Or, at least two of the plurality of first sets of film layers are stacked together, and at least two of the plurality of second sets of film layers are stacked together.

Optionally, one of the plurality of sets of film layers closest to the first surface and one of the plurality of sets of film layers farthest from the first surface in the bandpass filtering structure belong to the first sets of film layers.

Optionally, a film layer closest to the first surface in the bandpass filtering structure is the first material layer.

Optionally, a film layer farthest from the first surface in the bandpass filtering structure is the second material layer.

Optionally, the thickness of the film layer closest to the first surface in the bandpass filtering structure or the thickness of the film layer farthest from the first surface in the bandpass filtering structure is smaller than the thickness of the other film layers in the bandpass filtering structure.

Optionally, the film layer with the smallest thickness in the bandpass filtering structure is the first material layer. Or, the film with the smallest thickness in the bandpass filtering structure is the second film.

Optionally, the film layer with the largest thickness in the bandpass filtering structure is the first material layer.

Optionally, the first material layer is made of hydrogen-doped silicon.

Optionally, the second material layer is made of silicon dioxide.

Optionally, the anti-reflection structure includes a plurality of third material layers and a plurality of fourth material layers, which are alternatively stacked along the normal line. The refractive index of the third material layer is greater than the refractive index of the fourth material layer.

Optionally, in the anti-reflection structure, a film layer closest to the second surface is the third material layer, while a film layer farthest from the second surface is the fourth material layer.

Optionally, a thickness of the film layer closest to the second surface in the anti-reflection structure is smaller than a thickness of the other film layers in the anti-reflection structure. Or, a thickness of the film layer farthest from the second surface in the anti-reflection structure is smaller than a thickness of the other film layers in the anti-reflection structure.

Optionally, a thickness of the film layer farthest from the second surface in the anti-reflection structure is greater than a thickness of the other film layers in the anti-reflection structure.

Optionally, a thickness of the film layer closest to the second surface in the anti-reflection structure is less than the thickness of the other film layers in the anti-reflection structure, and less than the thickness of each film layer in the bandpass filtering structure.

Optionally, the material of a film layer farthest from the second surface in the anti-reflection structure is the same as that of the film layer farthest from the first surface in the bandpass filtering structure. Or, the material of a film layer closest to the second surface in the anti-reflection structure is the same as that of the film layer closest to the first surface in the bandpass filtering structure.

Optionally, the thickness of the film layer farthest from the second surface in the anti-reflection structure is the same as a thickness of the film layer farthest from the first surface in the bandpass filtering structure.

Optionally, in the anti-reflection structure, the thickness of the film layer farthest from the second surface is greater than the thickness of the film layer closest to the second surface. Or, in the anti-reflection structure, the thickness of the film layer farthest from the second surface is smaller than that of the film layer closest to the second surface.

Optionally, the thickness of one of the first material layers of the bandpass filtering structure is greater than the thickness of the other film layers in the bandpass filtering structure, and also greater than the thickness of each of the film layers in the anti-reflection structure.

Optionally, the third material layer is made of hydrogen-doped silicon.

Optionally, the fourth material layer is made of silicon dioxide.

Different embodiments of the narrow bandpass filtering element of the present invention are exemplarily described as follows.

First Embodiment

Please refer to FIG. 1, the narrow bandpass filtering element of the first embodiment includes a substrate 10, a bandpass filtering structure 20 and an anti-reflection structure 30. The substrate 10 is a glass substrate and has a first surface 11 and a second surface 12 opposite to the first surface 11. The number of film layers of the bandpass filtering structure 20 is greater than that of the anti-reflection structure 30.

The bandpass filtering structure 20 is formed on the first surface 11 and includes 24 film layers (i.e., the first film layer 20_1 to the twenty-fourth film layer 20_24). The 24 film layers are classified into NbTiOx layers, first material layers and second material layers according to their materials. The refractive index of the first material layer is higher than that of the NbTiOx layer, and the refractive index of the NbTiOx layer is higher than that of the second material layer. The material of the first material layer is, for example, but not limited to, silicon doped with hydrogen (hereinafter referred to as Si—H), and the material of the second material layer is, for example, but not limited to, silicon dioxide (SiO2). In the bandpass filtering structure 20, the extinction coefficient of the NbTiOx layer is about $0.1 \times 10^{-10}$ cm$^{-1}$~$1.0 \times 10^{-10}$ cm$^{-1}$, the refractive index of the NbTiOx layer in the wavelength range of 850 nm~940 nm is about 2.5, and the extinction coefficient of the first material layer is about $3.85 \times 10^{-5}$ cm$^{-1}$~$3.56 \times 10^{-4}$ cm$^{-1}$, the refractive index of the first material layer in the wavelength range of 850 nm~940 nm is about 3.3, the extinction coefficient of the second material layer approaches 0 cm$^{-1}$, and the refractive index of the second material layer in the wavelength range of 850 nm~940 nm is about 1.46~1.45.

The stacking principle of film layers of the bandpass filtering structure 20 is to mix and stack three kinds of sets of film layers (namely, the first set of film layers, the second set of film layers and the third set of film layers). Each kind of sets of film layers is composed of one layer of high refractive index material and one layer of low refractive index material. Specifically, the first set of film layers is composed of one first material layer (i.e., a high refractive index material layer) and one second material layer (i.e., a low refractive index material layer). The second set of film layers is composed of one NbTiOx layer (i.e., a low refractive index material layer) and one first material layer (i.e., a high refractive index material layer). The third set of film layer is composed of one NbTiOx layer (i.e., a high refractive index material layer) and one second material layer (i.e., a low refractive index material layer).

The 24 film layers include 4 NbTiOx layers, 11 first material layers and 9 second material layers, and the 24 film layers are stacked sequentially along the normal line N of the substrate 10. The film layer closest to the first surface 11 is the first film layer 20_1, and the film layer farthest away from the first surface 11 is the 24th film layer 20_24.

Please refer to the specific information of the bandpass filtering structure 20 formed on the first surface 11 in the narrow bandpass filtering element of the first embodiment shown in Table 1 below.

TABLE 1

| Set of film layer # | Film layer # | Material | Thickness (nm) |
|---|---|---|---|
| 1 | 1 | Si—H | 37.56 |
|   | 2 | SiO$_2$ | 78.04 |
| 2 | 3 | NbTiOx | 144.10 |
|   | 4 | Si—H | 56.36 |
| 1 | 5 | SiO$_2$ | 136.70 |
|   | 6 | Si—H | 64.69 |
| 2 | 7 | NbTiOx | 85.16 |
|   | 8 | Si—H | 111.18 |
| 2 | 9 | NbTiOx | 71.73 |
|   | 10 | Si—H | 113.63 |
| 1 | 11 | SiO$_2$ | 126.75 |
|   | 12 | Si—H | 71.36 |
| 1 | 13 | SiO$_2$ | 122.36 |
|   | 14 | Si—H | 259.26 |
| 1 | 15 | SiO$_2$ | 125.91 |
|   | 16 | Si—H | 67.90 |
| 1 | 17 | SiO$_2$ | 135.96 |
|   | 18 | Si—H | 257.36 |
| 1 | 19 | SiO$_2$ | 134.42 |
|   | 20 | Si—H | 59.34 |
| 3 | 21 | SiO$_2$ | 139.80 |
|   | 22 | NbTiOx | 126.29 |
| 1 | 23 | Si—H | 31.93 |
|   | 24 | SiO$_2$ | 30.00 |

It can be seen from Table 1 that in the bandpass filtering structure 20, the set of film layers closest to the first surface 11 and the set of film layers farthest away from the first surface 11 are both the first sets of film layers (i.e., a layer of Si—H and a layer of SiO2); the film layer closest to the first surface 11 in the bandpass filtering structure 20 is the first material layer (i.e. Si—H); the film layer farthest away from the first surface 11 in the bandpass filtering structure 20 is the second material layer (i.e. SiO2); and the thickness of the bandpass filtering structure 20 is about 2587.70 nm.

The anti-reflection structure 30 is formed on the second surface 12 and includes four film layers (i.e., the first film layer 30_1 to the fourth film layer 30_4). The four film layers are classified into the third material layer and the fourth material layer according to their materials. The refractive index of the third material layer is higher than that of the fourth material layer. The material of the third material layer is, for example, but not limited to, Si—H, and the material of the second material layer is, for example, but not limited to, silicon dioxide. In the anti-reflection structure 30, the extinction coefficient of the third material layer is about $3.85 \times 10^{-5}$ cm$^{-1}$~$3.56 \times 10^{-4}$ cm$^{-1}$, the refractive index of the third material layer in the wavelength range of 850 nm~940 nm is about 3.3, the extinction coefficient of the fourth material layer approaches 0 cm$^{-1}$, and the refractive index of the fourth material layer in the wavelength range of 850 nm~940 nm is about 1.46~1.45.

The stacking principle of film layers of the anti-reflection structure 30 is to use one kind of sets of film layers (i.e. the fourth set of film layers) to stack repeatedly. The fourth set of film layers is composed of one layer of high refractive index material and one layer of low refractive index material. Specifically, the fourth set of film layers is composed of one third material layer (i.e., a high refractive index material layer) and one fourth material layer (i.e., a low refractive index material layer).

The four film layers include two third material layers and two fourth material layers, and are stacked sequentially along the normal line N of the substrate 10, and the film layer closest to the second surface 12 is the first film layer 30_1, and the film layer farthest away from the second surface 12 is the fourth film layer 30_4.

Please refer to the specific information of the anti-reflection structure formed on the second surface in the narrow bandpass filtering element of the first embodiment shown in Table 2 below.

TABLE 2

| Set of film layer # | Film layer # | Material | Thickness (nm) |
|---|---|---|---|
| 4 | 1 | Si—H | 11.94 |
|   | 2 | SiO$_2$ | 92.14 |
| 4 | 3 | Si—H | 19.77 |
|   | 4 | SiO$_2$ | 186.82 |

It can be seen from Table 2 that the film layer closest to the second surface 12 in the anti-reflection structure 30 is the third material layer (i.e., Si—H), the film layer farthest away from the second surface 12 in the anti-reflection structure 30 is the fourth material layer (i.e., SiO2); the thickness of the film layer closest to the second surface 12 in the anti-reflection structure 30 is the smallest, the thickness of the film layer farthest away from the second surface 12 in the anti-reflection structure 30 is the largest, and the thickness of the anti-reflection structure 30 is about 310.60 nm.

Moreover, it can be known from Table 1 and Table 2 that the number of film layers of the bandpass filtering structure 20 is 6 times that of the anti-reflection structure 30, the material of the film layer closest to the second surface 12 in the anti-reflection structure 30 is the same as that of the film layer closest to the first surface 11 in the bandpass filtering structure 20, the material of the film layer farthest from the second surface 12 in the anti-reflection structure 30 is the same as that of the film layer farthest from the first surface 11 in the bandpass filtering structure 20, the thickness of the film layer closest to the second surface 12 in the anti-reflection structure 30 is smaller than that of any other film layer in the anti-reflection structure 30, and also smaller than the thickness of any film layer in the bandpass filtering structure 20, and the thickness of the fourteenth film layer of the bandpass filtering structure 20 is greater than the thickness of any other film layer of the bandpass filtering structure 20, and also greater than the thickness of any film layer of the anti-reflection structure 30.

The transmittance simulation test of the narrow bandpass filtering element in the first embodiment is performed below. The test conditions are as follows: placing the narrow bandpass filtering element in the atmospheric environment, so that the top and bottom of the bandpass filtering element are full of air; and then illuminating the narrow bandpass filtering element from above (i.e., the upper part of the figure) with the light with the reference wavelength of 550 nm and the incidence angles of 0 degree and 30 degrees respectively. The test results are shown in FIG. 2, wherein the curve C1 is the result of testing the narrow bandpass filtering element of the first embodiment with an incidence angle of 0 degree, and the curve C2 is the result of testing the narrow bandpass filtering element of the first embodiment with an incidence angle of 30 degrees.

Figure 2:
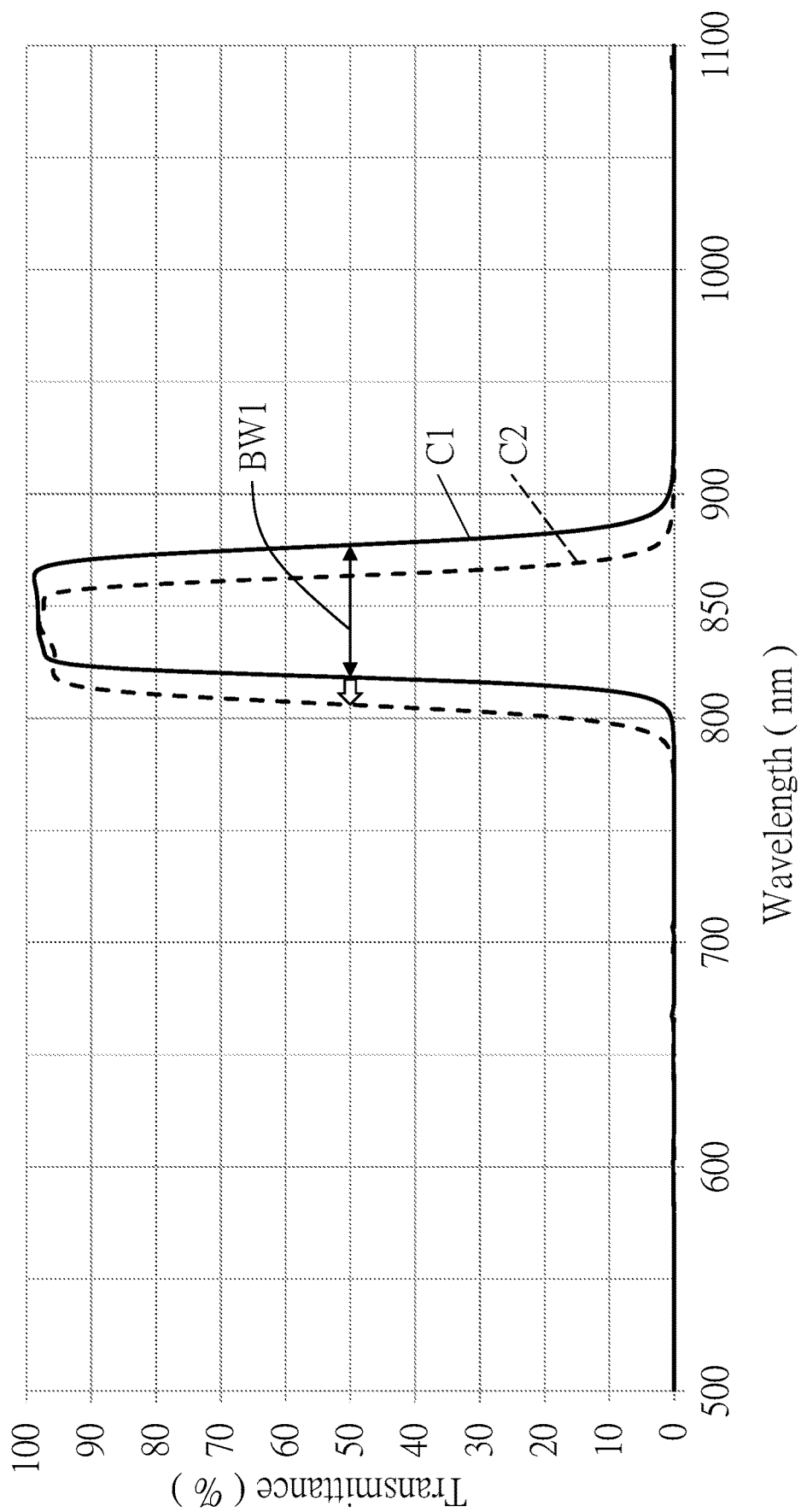
FIG. 2 is a schematic diagram of curves of frequency versus transmittance of the narrow bandpass filtering element in FIG. 1 at the incidence angles of 0 and 30 degrees.

In FIG. 2, the central wavelength of the curve C1 is 850 nm, and the curve C1 has a bandwidth BW1 of 60 nm and transmittance of up to 98% in the band corresponding to about transmittance of 50%. The light in the band corresponding to this bandwidth BW1 can pass through the narrow bandpass filtering element, and the light in the band other than this bandwidth BW1 will be filtered out. Moreover, the curve C2 shifts to the left (i.e., the left side of the figure) with respect to the curve C1, namely shifting to the short wavelength side, by 12 nm or less than 12 nm.

Second Embodiment

Figure 3:
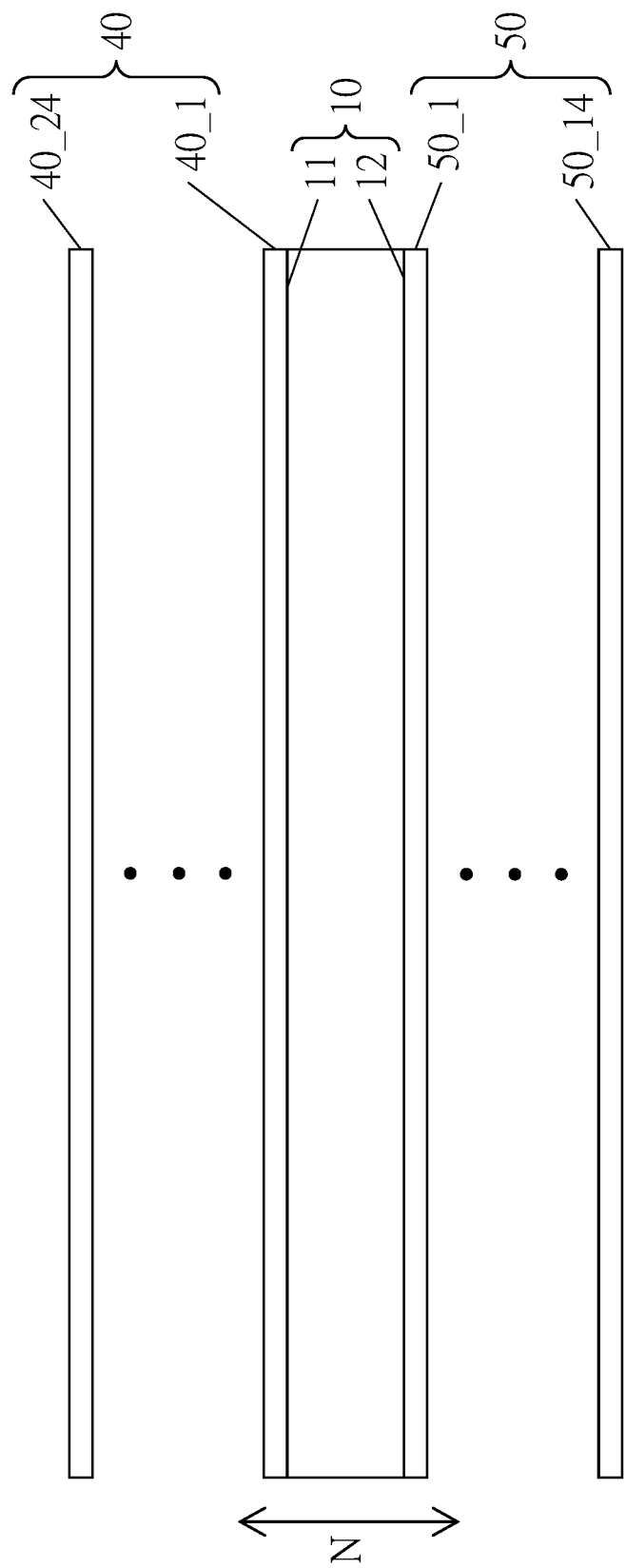
FIG. 3 is a schematic cross-section view of a narrow bandpass filtering element according to a second embodiment of the present invention.

Please refer to FIG. 3, the narrow bandpass filtering element of the second embodiment includes a substrate 10, a bandpass filtering structure 40 and an anti-reflection structure 50. The number of film layers of the bandpass filtering structure 40 is greater than that of the anti-reflection structure 50.

The bandpass filtering structure 40 is formed on the first surface 11 and includes 24 film layers (i.e., the first film layer 40_1 to the twenty-fourth film layer 40_24). The 24 film layers are classified into NbTiOx layers, first material layers and second material layers according to their materials. The refractive index of the first material layer is higher than that of the NbTiOx layer, and the refractive index of the NbTiOx layer is higher than that of the second material layer. The material of the first material layer is, for example but not limited to, Si—H, and the material of the second material layer is, for example but not limited to, silicon dioxide. In the bandpass filtering structure 40, the extinction coefficient of the NbTiOx layer is about $0.1 \times 10^{-10}$ cm$^{-1}$~$1.0 \times 10^{-10}$ cm$^{-1}$, the refractive index of the NbTiOx layer in the wavelength range of 850 nm~940 nm is about 2.5, and the extinction coefficient of the first material layer is about $1.7 \times 10^{-4}$ cm$^{-1}$~$1.1 \times 10^{-3}$ cm$^{-1}$, the refractive index of the first material layer in the wavelength range of 850 nm~940 nm is about 3.6, the extinction coefficient of the second material layer approaches 0 cm$^{-1}$, and the refractive index of the second material layer in the wavelength range of 850 nm~940 nm is about 1.46~1.45.

The stacking principle of film layers of the bandpass filtering structure 40 is to mix and stack two kinds of sets of film layers (i.e., the first set of film layers and the second set of film layers). Each set of film layers is composed of one layer of high refractive index material and one layer of low refractive index material. Specifically, the first set of film layers is composed of one first material layer (i.e., a high refractive index material layer) and one second material layer (i.e., a low refractive index material layer). The second set of film layers is composed of one NbTiOx layer (i.e. a low refractive index material layer) and one first material layer (i.e., a high refractive index material layer).

The 24 film layers include 6 NbTiOx layers, 12 first material layers and 6 second material layers, and the 24 film layers are stacked sequentially along the normal line N of the substrate 10. The film layer closest to the first surface 11 is the first film layer 40_1, and the film layer farthest away from the first surface 11 is the 24th film layer 40_24.

Please refer to the specific information of the bandpass filtering structure 40 formed on the first surface 11 in the narrow bandpass filtering element of the second embodiment shown in Table 3 below.

TABLE 3

| Set of film layer # | Film layer # | Material | Thickness (nm) |
|---|---|---|---|
| 1 | 1 | Si—H | 24.58 |
|  | 2 | Sio$_2$ | 138.65 |

TABLE 3-continued

| Set of film layer # | Film layer # | Material | Thickness (nm) |
|---|---|---|---|
| 2 | 3 | Si—H | 301.40 |
|  | 4 | NbTiOx | 82.11 |
| 1 | 5 | Si—H | 77.59 |
|  | 6 | Sio$_2$ | 122.89 |
| 2 | 7 | Si—H | 86.30 |
|  | 8 | NbTiOx | 61.93 |
| 2 | 9 | Si—H | 302.37 |
|  | 10 | NbTiOx | 86.08 |
| 1 | 11 | Si—H | 77.13 |
|  | 12 | Sio$_2$ | 140.36 |
| 2 | 13 | Si—H | 74.40 |
|  | 14 | NbTiOx | 91.00 |
| 2 | 15 | Si—H | 298.01 |
|  | 16 | NbTiOx | 85.59 |
| 1 | 17 | Si—H | 69.2 |
|  | 18 | Sio$_2$ | 135.91 |
| 1 | 19 | Si—H | 60.25 |
|  | 20 | Sio$_2$ | 93.98 |
| 2 | 21 | Si—H | 36.88 |
|  | 22 | NbTiOx | 73.58 |
| 1 | 23 | Si—H | 58.06 |
|  | 24 | Sio$_2$ | 30.00 |

It can be seen from Table 3 that the set of film layers closest to the first surface 11 and the set of film layers farthest away from the first surface 11 in the bandpass filtering structure 40 are the first sets of film layers, the film layer closest to the first surface 11 in the bandpass filtering structure 40 is the first material layer, the film layer farthest away from the first surface 11 in the bandpass filtering structure 40 is the second film layer; and the thickness of the bandpass filtering structure 40 is about 2608.25 nm.

The anti-reflection structure 50 is formed on the second surface 12 and includes 14 film layers (i.e., the first film layer 50_1 to the fourteenth film layer 50_14). These 14 film layers are classified into third material layers and fourth material layers according to the material. The refractive index of the third material layer is higher than that of the fourth material layer. The material of the third material layer is, for example but not limited to, Si—H, and the material of the second material layer is, for example but not limited to, silicon dioxide. In the anti-reflection structure 50, the extinction coefficient of the third material layer is about $1.7 \times 10^{-4}$ cm$^{-1}$~$1.1 \times 10^{-3}$ cm$^{-1}$, the refractive index of the third material layer is about 3.6 in the wavelength range of 850 nm~940 nm, the extinction coefficient of the fourth material layer approaches 0 cm$^{-1}$, and the refractive index of the fourth material layer is about 1.46~1.45 in the wavelength range of 850 nm~940 nm.

The stacking principle of film layers of the anti-reflection structure 50 is to use one kind of sets of film layers (i.e., the third set of film layers) to stack repeatedly. The third set of film layers is composed of one layer of high refractive index material and one layer of low refractive index material. Specifically, the third set of film layers is composed of one third material layer (i.e., a high refractive index material layer) and one fourth material layer (i.e., a low refractive index material layer).

The 14 film layers include 7 third material layers and 7 fourth material layers, and the 14 film layers are stacked sequentially along the normal line N of the substrate 10. The film layer closest to the second surface 12 is the first film layer 50_1, and the film layer farthest away from the second surface 12 is the 14th film layer 50_14.

Please refer to the specific information of the anti-reflection structure 50 formed on the second surface in the narrow bandpass filtering element of the second embodiment shown in Table 4 below.

TABLE 4

| Set of film layer # | Film layer # | Material | Thickness (nm) |
|---|---|---|---|
| 3 | 1 | Si—H | 41.59 |
|   | 2 | SiO$_2$ | 69.91 |
| 3 | 3 | Si—H | 47.09 |
|   | 4 | SiO$_2$ | 125.03 |
| 3 | 5 | Si—H | 51.03 |
|   | 6 | SiO$_2$ | 109.54 |
| 3 | 7 | Si—H | 41.57 |
|   | 8 | SiO$_2$ | 101.92 |
| 3 | 9 | Si—H | 50.04 |
|   | 10 | SiO$_2$ | 127.12 |
| 3 | 11 | Si—H | 52.52 |
|   | 12 | SiO$_2$ | 80.14 |
| 3 | 13 | Si—H | 27.45 |
|   | 14 | SiO$_2$ | 30.00 |
| — | — | — | — |

It can be seen from Table 4 that the film layer closest to the second surface 12 in the anti-reflection structure 50 is the third material layer, the film layer farthest away from the second surface 12 in the anti-reflection structure 50 is the fourth material layer, the film layer with the largest thickness in the anti-reflection structure 50 is the fourth film layer, the thickness of the film layer farthest away from the second surface 12 in the anti-reflection structure 50 is the smallest, the thickness of the film layer farthest away from the second surface 12 is smaller than the thickness of the film layer closest to the second surface 12 in the anti-reflection structure 50, and the thickness of the anti-reflection structure 50 is about 954.95 nm.

And it can be known from Table 3 and Table 4 that the number of film layers of the bandpass filtering structure 40 is about 1.7 times that of the anti-reflection structure 50, the material of the film layer closest to the second surface 12 in the anti-reflection structure 50 is the same as that of the film layer closest to the first surface 11 in the bandpass filtering structure 40, the material of the film layer farthest from the second surface 12 in the anti-reflection structure 50 is the same as that of the film layer farthest from the first surface 11 in the bandpass filtering structure 40, the material of the film layer closest to the second surface 12 in the anti-reflection structure 50 is the same as that of the film layer closest to the first surface 11 in the bandpass filtering structure 40, the thickness of the film layer closest to the first surface 11 in the bandpass filtering structure 40 is smaller than the thickness of any other film layer in the bandpass filtering structure 40, and also smaller than the thickness of any film layer in the anti-reflection structure 50, the thickness of the ninth film layer of the bandpass filtering structure 40 is greater than the thickness of any other film layer of the bandpass filtering structure 40, and also greater than the thickness of any film layer of the anti-reflection structure 50, and the thickness of the film layer farthest from the second surface 12 in the anti-reflection structure 50 is the same as that of the film layer farthest from the first surface 11 in the bandpass filtering structure 40.

The transmittance simulation test of the narrow bandpass filtering element in the second embodiment is performed below. The test conditions are as follows: placing the narrow bandpass filtering element in the atmospheric environment so that below and above the narrow bandpass filtering element is air; and then illuminating the narrow bandpass filtering element from above (i.e., the upper part of the figure) with the light with the reference wavelength of 550 nm and the incidence angles of 0 degree and 30 degrees respectively. The test results are shown in FIG. 4, wherein the curve C3 is the result of testing the narrow bandpass filtering element in the second embodiment at an incidence angle of 0 degree, and the curve C4 is the result of testing the narrow bandpass filtering element in the second embodiment at an incidence angle of 30 degrees.

Figure 4:
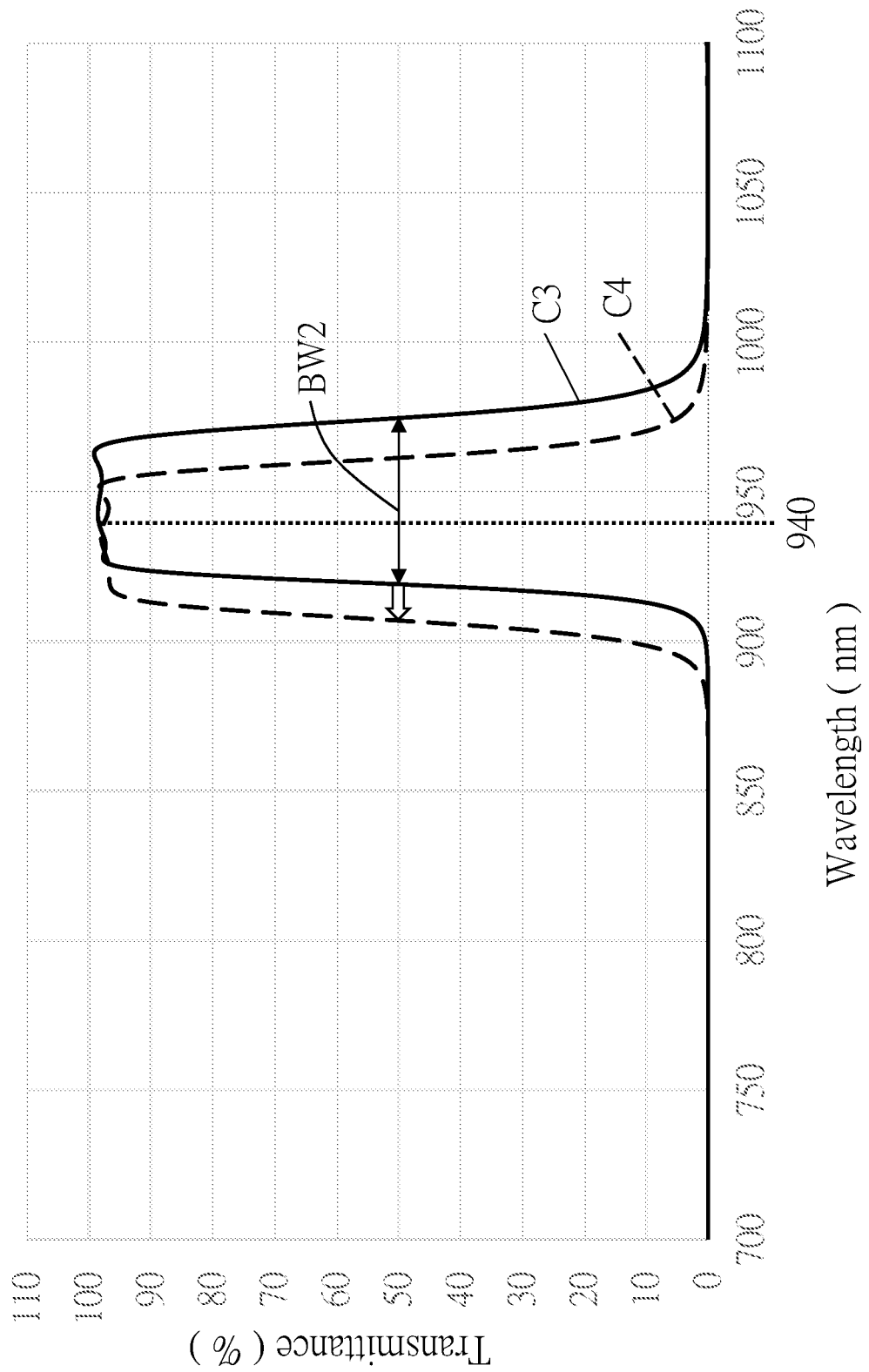
FIG. 4 is a schematic diagram of curves of frequency versus transmittance of the narrow bandpass filtering element in FIG. 3 at the incident angles of 0 and 30 degrees.

In FIG. 4, the central wavelength of the curve C3 is 940 nm, and the curve C3 has a bandwidth BW2 of 60 nm and the transmittance of up to 98% in the band corresponding to the transmittance of about 50%. The light in the band corresponding to this bandwidth BW2 will pass through the narrow bandpass filtering element, and the light in the band other than this bandwidth BW2 will be filtered out. Moreover, the curve C4 shifts to the left (left side of the map) with respect to the curve C3, i.e., shifts to the short wavelength side, by 12 nm or less than 12 nm.

The narrow bandpass filtering element of the invention is disposed with a buffer layer of silicon dioxide. If the buffer layer is disposed between the substrate 10 and the bandpass filtering structure or between the substrate 10 and the anti-reflection structure, it not only can increase the adhesion of coating, but also can increase the transmittance of light because the refractive index of the buffer layer is similar to that of the substrate 10 made of glass. If the buffer layer is an additional material layer covering the bandpass filtering structure or the anti-reflection structure during the manufacturing process, it can be used as an expendable layer to be removed during the cleaning step.

The bandpass filtering structure and the anti-reflection structure of the invention are made by the ICP plasma sputtering method, so the thickness of the high refractive index material layer can be larger, and the thickness of the low refractive index material layer can be relatively thinner, thereby keeping the overall thickness within a stable range. In addition, the formation of the NbTiOx layer, the first material layer and the third material layer by the ICP plasma sputtering method can make the refractive index of the NbTiOx layer reach 2.5 in the wavelength range of 850 nm~940 nm, and the refractive index of the first material layer and the third material layer reach 3.3 or 3.6 in the wavelength range of 850 nm~940 nm.

In the present invention, selecting NbTiOx or Si—H to form the high refractive index material layer of each set of film layers can not only make the application of the narrow bandpass filtering element more diversified, but also reduce the number of sets of film layers by collocating and stacking different types of sets of film layers. Therefore, the narrow bandpass filtering elements of the present invention are more energy saving than the narrow bandpass filtering elements made by a traditional sputtering method.

In this way, the narrow bandpass filtering element of the invention can block more than 98% of noise and the light in the waveband except the narrow bandwidth, and only allow the single waveband light within the narrow bandwidth to pass, so as to achieve the purpose of allowing only the light (a feedback signal) from an optical transmitter to pass when the narrow bandpass filtering element is applied to an optical receiver.

In addition, the invention also provides an electronic device according to an embodiment, which includes the narrow bandpass filtering element described above.

Although the invention is disclosed as above with the aforementioned embodiments, these embodiments are not intended to limit the invention. Without departing from the spirit and scope of the present invention, the combination of modification and various embodiments are all within the scope of the claims of the present invention. For the scope of protection defined by the invention, please refer to the attached claims.

What is claimed is:

1. A narrow bandpass filtering element comprising:
   a substrate including a first surface and a second surface opposite to the first surface;
   a bandpass filtering structure formed on the first surface and including a plurality of NbTiOx layers, a plurality of first material layers with a refractive index higher than a refractive index of the NbTiOx layer, and a plurality of second material layers with a refractive index lower than the refractive index of the NbTiOx layer, wherein the plurality of NbTiOx layers, the plurality of first material layers and the plurality of second material layers are stacked along a normal line of the substrate; and
   an anti-reflection structure formed on the second surface.

2. The narrow bandpass filtering element as claimed in claim 1, wherein the bandpass filtering structure includes a plurality of sets of film layers put into a stack, the plurality of sets of film layers includes a plurality of first sets of film layers and a plurality of second sets of film layers, each of the plurality of first sets of film layers includes one of the plurality of first material layers and one of the plurality of second material layers, and each of the plurality of second sets of film layers includes one of the plurality of first material layers and one of the plurality of NbTiOx layers.

3. The narrow bandpass filtering element as claimed in claim 2, wherein the plurality of sets of film layers further includes a third set of film layers, and the third set of film layers is composed of one of the plurality of NbTiOx layers and one of the plurality of second material layers, and is located between adjacent two of the plurality of first sets of film layers.

4. The narrow bandpass filtering element as claimed in claim 2, wherein at least two of the plurality of first sets of film layers are stacked together or at least two of the plurality of second sets of film layers are stacked together.

5. The narrow bandpass filtering element as claimed in claim 2, wherein one of the plurality of sets of film layers closest to the first surface and one of the plurality of sets of film layers farthest from the first surface in the bandpass filtering structure belong to the first sets of film layers.

6. The narrow bandpass filtering element as claimed in claim 2, wherein a film layer closest to the first surface in the bandpass filtering structure is the first material layer, and a film layer farthest from the first surface in the bandpass filtering structure is the second material layer.

7. The narrow bandpass filtering element as claimed in claim 1, wherein a thickness of a film layer closest to the first surface or a thickness of a film layer farthest from the first surface in the bandpass filtering structure is smaller than thicknesses of the other film layers in the bandpass filtering structure.

8. The narrow bandpass filtering element as claimed in claim 1, wherein a film layer with the smallest thickness in the bandpass filtering structure is the first material layer or the second material layer, and a film layer with the largest thickness in the bandpass filtering structure is the first material layer.

9. The narrow bandpass filtering element as claimed in claim 1, wherein the anti-reflection structure includes a plurality of third material layers and a plurality of fourth material layers, which are alternately stacked along the normal line, and a refractive index of the third material layer is greater than a refractive index of the fourth material layer; and in the anti-reflection structure, a film layer closest to the second surface is the third material layer, and a film layer farthest from the second surface is the fourth material layer.

10. The narrow bandpass filtering element as claimed in claim 9, wherein a thickness of the film layer closest to the second surface or a thickness of the film layer farthest from the second surface in the anti-reflection structure is smaller than thicknesses of the other film layers in the anti-reflection structure.

11. The narrow bandpass filtering element as claimed in claim 9, wherein a thickness of the film layer farthest from the second surface in the anti-reflection structure is greater than that of the other film layers in the anti-reflection structure.

12. The narrow bandpass filtering element as claimed in claim 9, wherein a film layer with the largest thickness in the anti-reflection structure is the fourth film layer.

13. The narrow bandpass filtering element as claimed in claim 9, wherein a thickness of the film layer closest to the second surface in the anti-reflection structure is less than thicknesses of the other film layers in the anti-reflection structure, and less than a thickness of each film layer in the bandpass filtering structure.

14. The narrow bandpass filtering element as claimed in claim 9, wherein a thickness of the film layer farthest from the second surface in the anti-reflection structure is the same as a thickness of a film layer farthest from the first surface in the bandpass filtering structure.

15. The narrow bandpass filtering element as claimed in claim 9, wherein a thickness of one of the plurality of first material layers of the bandpass filtering structure is greater than thicknesses of the other film layers in the bandpass filtering structure, and greater than a thickness of each film layer in the anti-reflection structure.

16. The narrow bandpass filtering element as claimed in claim 9, wherein the first material layer and the third material layer are made of hydrogen-doped silicon, and the second material layer and the fourth material layer are made of silicon dioxide.

17. The narrow bandpass filtering element as claimed in claim 1, wherein the refractive index of the NbTiOx layer in a wavelength range of 850 nm to 940 nm is 2.5.

18. The narrow bandpass filtering element as claimed in claim 1, wherein an extinction coefficient of the NbTiOx layer is $0.1 \times 10^{-10}$ cm$^{-1}$~$1.0 \times 10^{-10}$ cm$^{-1}$.

19. The narrow bandpass filtering element as claimed in claim 1, wherein the refractive index of the first material layer in a wavelength range of 850 nm to 940 nm is 3.3 or 3.6.

20. The narrow bandpass filtering element as claimed in claim 1, wherein an extinction coefficient of the first material layer is $3.85 \times 10^{-5}$ cm$^{-1}$~$3.56 \times 10^{-4}$ cm$^{-1}$.

21. The narrow bandpass filtering element as claimed in claim 1, wherein an extinction coefficient of the first material layer is $1.7 \times 10^{-4}$ cm$^{-1}$~$1.1 \times 10^{-3}$ cm$^{-1}$.

22. The narrow bandpass filtering element as claimed in claim 9, wherein the refractive index of the third material layer in a wavelength range of 850 nm~940 nm is 3.3 or 3.6.

23. The narrow bandpass filtering element as claimed in claim 9, wherein an extinction coefficient of the third material layer is $3.85 \times 10^{-5}$ cm$^{-1}$~$3.56 \times 10^{-4}$ cm$^{-1}$.

24. The narrow bandpass filtering element as claimed in claim 9, wherein an extinction coefficient of the third material layer is $1.7 \times 10^{-4}$ cm$^{-1}$~$1.1 \times 10^{-3}$ cm$^{-1}$.

25. The narrow bandpass filtering element as claimed in claim 1, wherein a bandwidth of the narrow bandpass filtering element is 60 nm.

* * * * *